Nov. 29, 1932.    J. E. BRUCE    1,889,192
MEAT FRENCHER
Filed Sept. 2, 1931    2 Sheets-Sheet 1
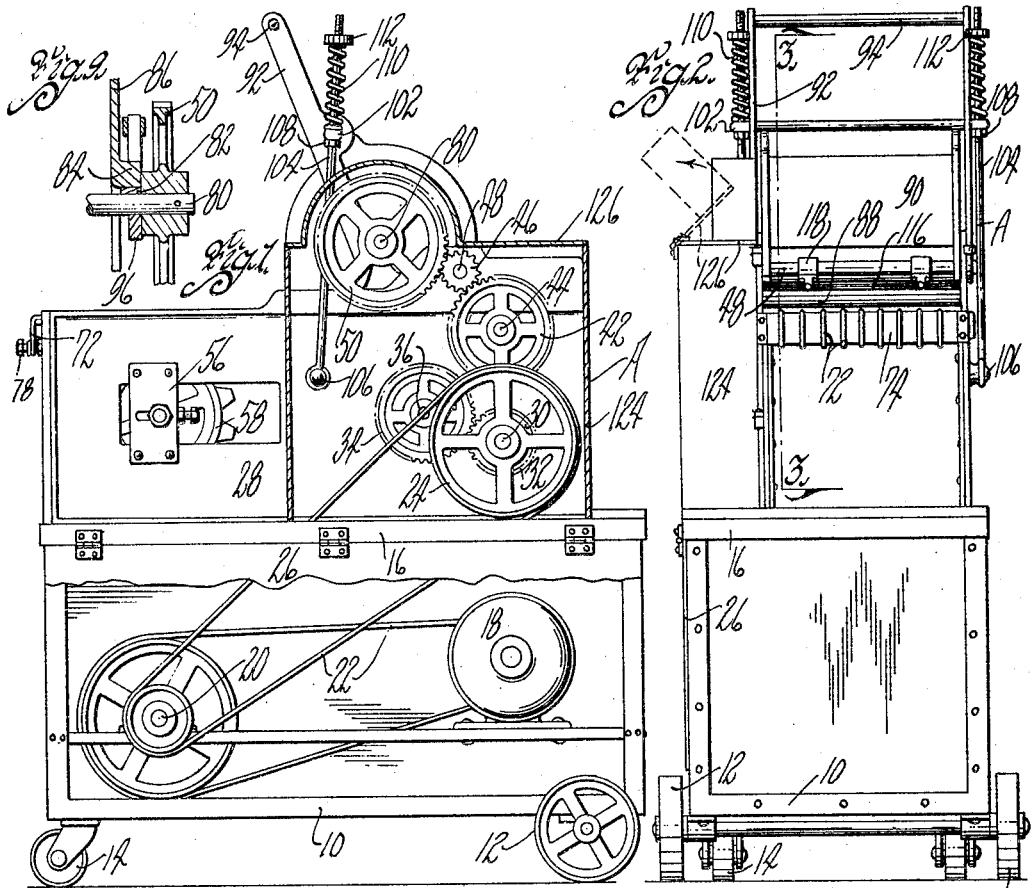
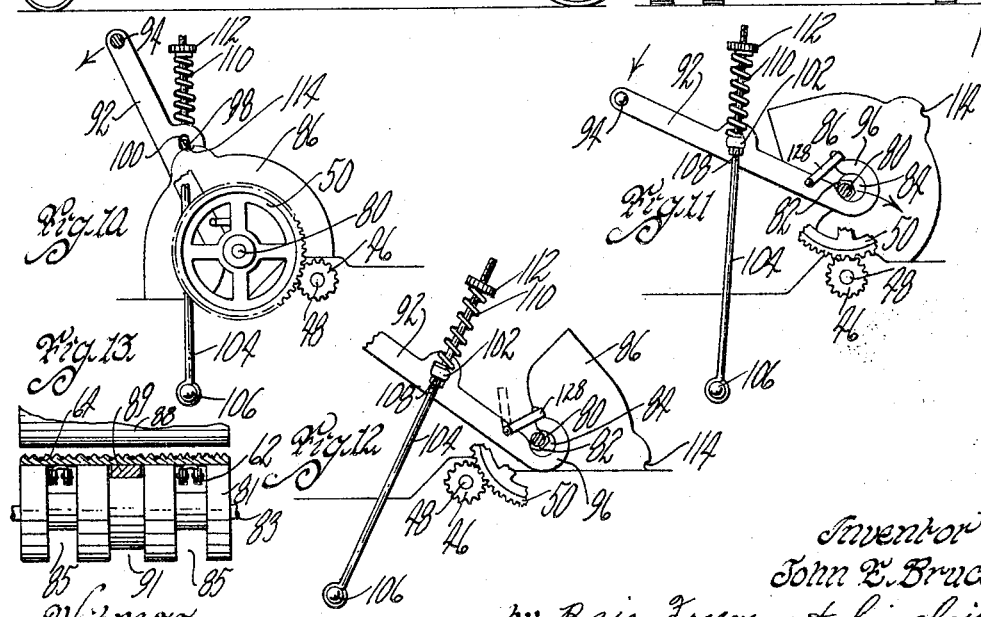

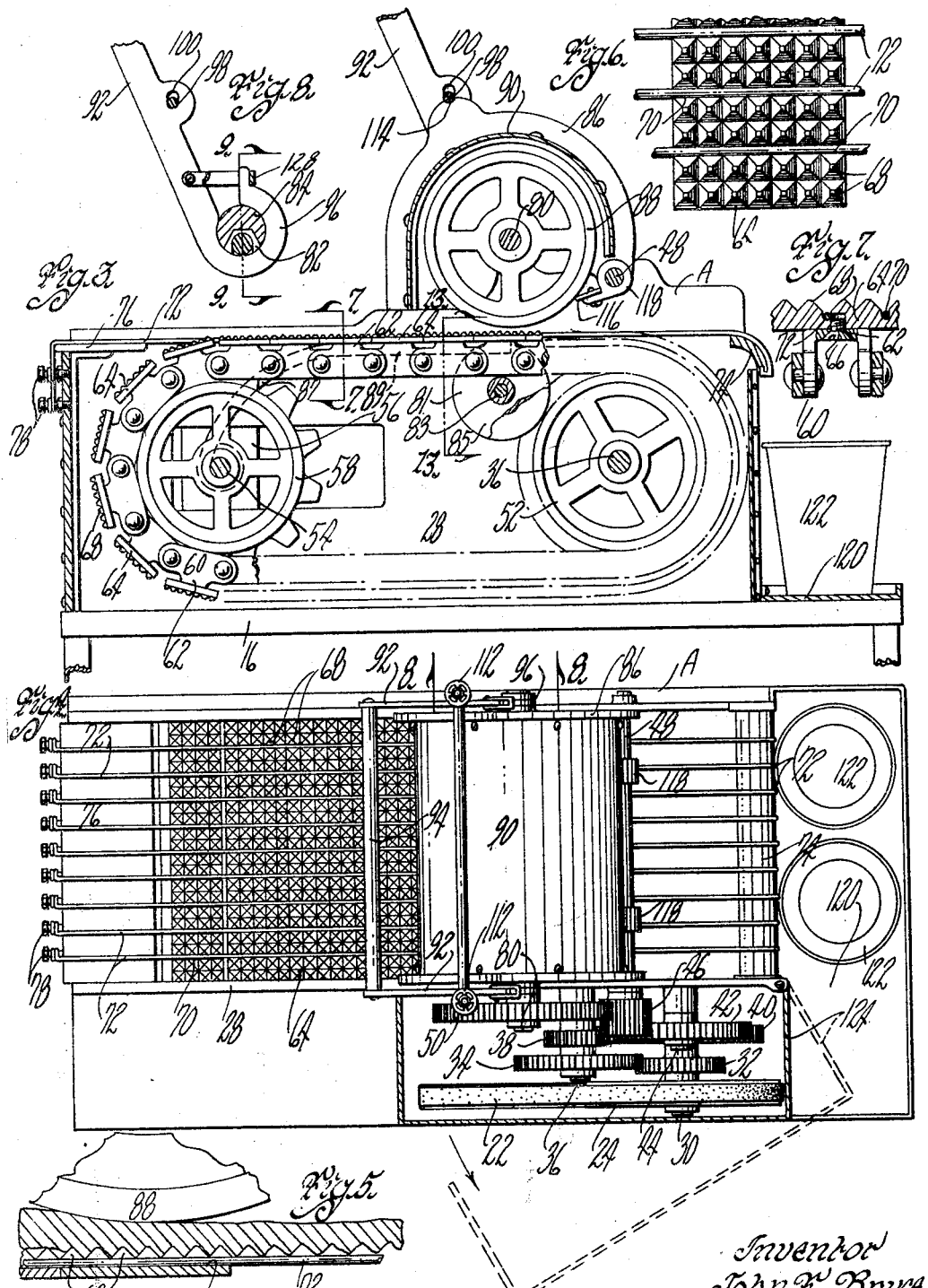

Patented Nov. 29, 1932

1,889,192

UNITED STATES PATENT OFFICE

JOHN E. BRUCE, OF DES MOINES, IOWA

MEAT FRENCHER

Application filed September 2, 1931. Serial No. 560,775.

The object of my invention is to provide a meat frencher which is of simple, durable and comparatively inexpensive construction.

A further object is to provide a meat frencher in which a combination conveyor and mangle device operates in conjunction with a roller or other meat presser device which presses meat into the surface of the conveyor, such surface being preferably spiked.

A further object is to provide stripper means for stripping the meat so pressed from the surface of the conveyor and delivering it to a place where it may be conveniently transferred by an operator into buckets or other containers.

Still a further object is to provide novel means of driving the spiked conveyor and the meat presser roller and at the same time allowing for swinging of the roller to an inoperative position from which position it may be removed from the machine for cleaning or replacement.

Still a further object is to provide novel means for swinging the roller to an inoperative position, said means being also used for swinging the roller to operating position and imposing spring tension on it.

Another object is to provide a novel bearing construction for the roller so that the roller can be removed from its bearings when in inoperative position only.

With these and other objects in view my invention consists in the construction, arrangement and combination of the various parts of my device, whereby the objects contemplated are attained as hereinafter more fully set forth, pointed out in my claims, and illustrated in the accompanying drawings, in which:

Figure 1 is a side elevation of a meat frencher embodying my invention.

Figure 2 is an end elevation of the same.

Figure 3 is a vertical, longitudinal, sectional view on the line 3—3 of Figure 2 showing the parts on an enlarged scale.

Figure 4 is a plan view of the machine with a gear casing thereof shown in section.

Figure 5 is an enlarged sectional view showing the operation of the device for frenching meat.

Figure 6 is a plan view of the meat frenching conveyor.

Figure 7 is a sectional view of a portion of the conveyor as taken on the line 7—7 of Figure 3.

Figure 8 is a sectional view on the line 8—8 of Figure 4 showing a bearing construction for the meat frencher roller.

Figure 9 is a sectional view on the line 9—9 of Figure 8.

Figures 10, 11 and 12 are diagrammatic views showing how the meat presser roller may be moved to inoperative position; and Figure 13 is a sectional view taken on the line 13—13 of Figure 3.

On the accompanying drawings I have used the reference numeral 10 to indicate a base. The base 10 is preferably supported by wheels 12 and swivel castors 14 so that it may be readily transported from one place to another in a butcher's shop or packing house.

A top 16 is provided spaced above the base 10 for supporting the meat frenching machine, indicated generally as A. The space between the base 10 and the top 16 is provided for enclosing an electric motor 18 or other suitable source of power, a counter shaft 20 and the pulleys thereon and belts 22 for transmitting rotation from the motor to a drive pulley 24 of the machine A. The parts 18, 20 and 22 are suitably enclosed by panels or doors 26.

The machine A has a main frame 28 in which is journaled a drive shaft 30. The drive pulley 24 is mounted on the drive shaft 30 and causes rotation of a pinion 32. The pinion 32 meshes with a conveyor gear 34 on a conveyor shaft 36. The gear 34 also rotates a pinion 38 which, through an intermediate gear 40 loosely mounted for rotation on the drive shaft 30, rotates a second intermediate gear 42. The gear 42 is rotatable on a stub shaft 44.

Meshing with the second intermediate gear 42 is an intermediate pinion 46 rotatable on a pivot shaft 48. The pinion 46 meshes with a meat presser roller gear 50.

The conveyor shaft 36 is journaled relative to the main frame 28 and between the sides of the main frame are conveyor rollers or sprocket wheels 52 secured thereto. An idler conveyor shaft 54 is journaled in adjustable bearings 56 and has conveyor rollers or sprockets 58 thereon.

A pair of conveyor chains 60 extend around the pairs of sprockets 52 and 58. The links of the conveyor chains have cross pieces 62 to which conveyor bars 64 are secured as by counter-sunk screws 66 (see Figure 7).

The conveyor bars 64 have spiked upper surfaces, the spikes being indicated at 68 and they also have grooves 70 arranged longitudinally of the conveyor. Stripper wires 72 extend through the grooves 70 and beyond the intake and discharge ends of the conveyor as best shown in Figure 3.

One end of each stripper wire 72 extends over a cross bar 74 and is anchored thereto. The other end of each stripper wire extends over a cross bar 76 and is anchored to a set screw 78 whereby the wires may be tightened by rotation of the set screw. Lock nuts are provided on the set screws to retain such adjustment.

The meat presser roller gear 50 is secured to a meat presser roller shaft 80 which is journaled in bearing blocks 82. The bearing blocks 82 have three surfaces coacting with similar surfaces of studs 84 which extend from side plates 86. The side plates 86 are pivoted on the shaft 48.

Between the side plates 86 a meat presser roller 88 is secured to the shaft 80 and is spaced slightly above the upper surface of the conveyor bars 64 as shown in Figure 3.

In order to hold the conveyor bars 64 up so that the meat will be properly pressed between them and the presser roller 88, I mount an idler roller 81 on a shaft 83 under the conveyor bars 64 and directly below the meat presser roller 88. (See Figures 3 and 13.) The idler roller 81 prevents the bars 64 from being pressed downwardly during the frenching operation. This roller is provided, near its ends, with annular grooves 85 to permit the free passage of the links 62.

Pivoted on the shaft 54 is a supporting bar 87, which is curved upwardly and thence rearwardly in the machine, to form a horizontal upper portion 89 to slidably support the bars 64. The roller 81 is provided with a central annular groove 91 into which the rearward end of the supporting bar portion 87 extends. The depth of the groove 91 is such that the bar 87 will conveniently ride on the roller 81 and will properly support the bars 64.

Levers 92 having a cross bar 94 serving as a handle are provided with portions 96 (see Figure 8) which encircle the bearing blocks 82 and studs 84. A tension rod 98 extends through slots 100 of the levers 92 and has enlarged ends 102 through which links 104 are slidably mounted.

The links 104 are pivoted to the main frame 28 at 106. Adjustable stop nuts 108 are provided on the links 104. Springs 110 are provided on the links 104 between the enlargements 102 and adjustable tension nuts 112 on the links.

The tension rod 98 is adapted to coact with notches 114 in the side plates 86, as shown in Figure 3. A scraper 116 is carried by a bracket 118 on the shaft 48. A platform 120 is provided on which buckets 122 or other suitable containers may be placed for receiving frenched meat from the machine A. A hinged cover 124 is provided for the gearing of the machine A and has a separate hinged top 126, as shown in Figure 2.

*Practical operation*

In the operation of my device, the parts in the position shown in Figures 1, 2, 3 and 4 are "operative". One operator places pieces of meat on the conveyor bars 64 at the left of the machine as viewed in Figures 3 and 4. The conveyor bars serve to convey the meat to a position where it is engaged by the presser roller 88, as shown in Figure 5. The roller presses the meat into the spiked surface of the conveyor for thus frenching and tearing down the meat fibres, so as to make it more tender and also ornament it, which has been found desirable from the standpoint of the butcher selling the meat.

There is a tendency for the meat to follow the conveyor bars, but since the stripper wires 72 extend beyond the discharge end of the conveyor, the meat is pushed out on the wires and more meat coming behind it tends to push it along the wires to a convenient position for a second operator to slide the meat over the cross bar 74 and into the containers 122. The scraper 116 prevents the accumulation of small pieces of meat on the roller 88. The springs 110 impose a spring tension which normally keeps the roller in the position shown in Figure 3, but allows it to raise up for extra thick pieces of meat, against the tension of the spring which may be adjusted by the nuts 112.

When it is desired to remove the roller 88 for cleaning or replacing with another roller (a spiked roller may be substituted if desired), the cross bar 94 is engaged and jerked toward the left, as in Figure 10, which causes the tension rod 98 to slide upwardly in the slots 100 for unlatching the side plates 86. Further movement of the levers 92 to the position shown in Figure 11, causes the enlargements 102 to engage the nuts 108 and exert lifting movement on the ends 96 of the levers 92. This swings the side plates 86 and the roller 88 upwardly and by pushing toward the right on the levers 92 the parts finally assume the position shown in Figure 12.

In the Figure 12 position the studs 84 have rotated to a position where the shaft 80 may be removed from the bearing blocks 82 (which are of slotted construction as shown best in Figure 8, and are readily removable). In this position closure links 128 are swung to the dotted line position for allowing removal of the shaft 80, the gear 50 and the roller 88.

I have provided a meat frencher in which a conveyor instead of a roller is used for both frenching and conveying the meat, in which respect my device is superior to the type of frencher in which rollers only are used. This forms an effective conveyor as well as frencher and by the novel arrangement of stripper wires, the meat after being frenched is stripped from the conveyor in an efficient manner.

Some changes may be made in the construction and arrangement of the parts of my device without departing from the real spirit and purpose of my invention, and it is my intention to cover by my claims, any modified forms of structure or use of mechanical equivalents which may be reasonably included within their scope.

I claim as my invention:

1. In a meat frencher, a conveyor, having a spiked surface, means for imparting movement to said conveyor, means above said conveyor to press meat into said surface, means to strip meat from the surface at the end of the conveyor, said last means comprising stripper wires extending longitudinally relative to said conveyor, located at the bottom of said surface and extending beyond the reception and discharge ends of the conveyor and means for anchoring the ends of said wires.

2. In a meat frencher, a conveyor, a shaft thereabove, a frame supported on said shaft, a meat presser carried by said frame and means for retaining said frame in meat pressing position and for moving it to an inoperative position, comprising a lever pivoted thereto, a pin carried by said lever at a point spaced from the pivot point of the lever to the frame, said frame having a notch for said pin to coact with, resilient means causing such coaction and thereby exerting tension on said meat presser and a pivotally mounted link connected with said pin.

3. In a meat frencher, a conveyor, a shaft thereabove, a frame supported on said shaft, a meat presser carried by said frame and means for retaining said frame in meat pressing position and for moving it to an inoperative position, comprising a lever pivoted thereto, a pin carried by said lever at a point spaced from the pivot point of the lever to the frame, said frame having a notch for said pin to coact with, and resilient means causing such coaction and thereby exerting tension on said meat presser.

4. In a meat frencher, a main frame, a conveyor, a roller frame pivoted to said main frame, a meat presser roller carried thereby and levers pivoted intermediate their ends to said main frame and at one end of each to said roller frame for swinging said roller frame to operative and inoperative positions, said levers having bearings for mounting said presser roller which are removable when said roller frame is in inoperative position.

5. In a meat frencher, a main frame, a conveyor, a roller frame pivoted to said main frame, and having studs extending from the sides thereof, a meat presser roller having bearings coacting with said studs, levers encircling said studs and said bearings and link connections between said levers and said main frame for swinging said roller frame when said levers are swung.

6. In a meat frencher, a main frame, a conveyor, a roller frame pivoted to said main frame, and having studs extending from the sides thereof, a meat presser roller having bearings coacting with said studs, levers encircling said studs and said bearings, link connections between said levers and said main frame which swing said roller frame when said levers are swung and means on said connections for imposing a resilient tension on said roller frame toward said main frame.

7. In a meat frencher, a pair of conveyor rollers, a conveyor belt therearound, the outer surface of said conveyor belt being spiked, means for imparting movement to said conveyor belt, a meat engaging roller spaced above said conveyor belt to press meat into the spiked surface thereof, means for imparting rotation to said meat engaging roller and a supporting roller below the upper stretch of said conveyor and in vertical alignment with said meat engaging roller, said supporting roller having a groove and a supporting bar for said conveyor having one end resting in said groove.

8. In a device of the class described, a main frame, a roller frame pivoted to said main frame and having studs extending from the sides thereof, a meat presser roller having bearings coacting with said studs, levers encircling said studs and said bearings, link connections between said levers and said main frame which swing said roller frame when said levers are swung and means on said connections for imposing a resilient tension on said roller frame toward said main frame.

9. In a device of the class described, a main frame, a meat presser frame pivoted relative thereto, a lever pivoted to said meat presser frame and having a link connecting it with said main frame whereby said lever can be manipulated to swing said meat presser frame to operative and inoperative positions, said meat presser frame having a notch and a projection carried by said lever and slidable relative to it and relative to said link, said projection being adapted to coact with said notch when said meat presser frame is in operative position and spring means constraining said projection to engage in said notch to retain said meat presser frame in operative position and to also impose thereon a tension in a meat pressing direction.

Des Moines, Iowa, August 26, 1931.

JOHN E. BRUCE.